(12) United States Patent
Sull et al.

(10) Patent No.: US 9,070,043 B2
(45) Date of Patent: Jun. 30, 2015

(54) METHOD AND APPARATUS FOR ANALYZING VIDEO BASED ON SPATIOTEMPORAL PATTERNS

(71) Applicant: Korea University Research and Business Foundation, Seoul (KR)

(72) Inventors: Sang Hoon Sull, Seoul (KR); Soon Hong Jung, Gyeonggi-do (KR)

(73) Assignee: Korea University Research and Business Foundation, Seoul (KR)

( * ) Notice: Subject to any disclaimer, the term of this patent is extended or adjusted under 35 U.S.C. 154(b) by 137 days.

(21) Appl. No.: 13/780,221

(22) Filed: Feb. 28, 2013

(65) Prior Publication Data

US 2014/0241626 A1    Aug. 28, 2014

(51) Int. Cl.
*G06K 9/62* (2006.01)
*G06K 9/46* (2006.01)

(52) U.S. Cl.
CPC ............ *G06K 9/4647* (2013.01); *G06K 9/4652* (2013.01)

(58) Field of Classification Search
USPC ......... 382/162, 164, 165, 168, 170, 173, 224, 382/225; 375/240.11, 240.12, 240.16, 375/240.24; 348/42, 624
See application file for complete search history.

(56) References Cited

U.S. PATENT DOCUMENTS

| 8,494,234 | B1* | 7/2013 | Bozinovic et al. ............. 382/124 |
| 2002/0154697 | A1* | 10/2002 | Jeon ......................... 375/240.16 |
| 2003/0035478 | A1* | 2/2003 | Taubman .................. 375/240.11 |
| 2004/0233987 | A1* | 11/2004 | Porikli et al. ............. 375/240.16 |
| 2005/0002572 | A1* | 1/2005 | Saptharishi et al. .......... 382/224 |
| 2007/0109448 | A1* | 5/2007 | Winger et al. ................ 348/624 |
| 2012/0213438 | A1* | 8/2012 | Quan ............................ 382/170 |
| 2014/0241626 | A1* | 8/2014 | Sull et al. ...................... 382/165 |

OTHER PUBLICATIONS

Kim, H., et al., "Visual Rhythm and Shot Verification"; Multimedia Tools and Applications, 15, 227-245, 2001; 2001 Kluwer Academic Publisher, Manufactured in the Netherlands (pp. 227-245).
Liu, F., et al., "Finding Periodicity in Space and Time"; The Media Laboratory, E15-383; Massachusetts Institute of Technology Cambridge, MA 02139, M.I.T. Media Laboratory Perceptual Computing Section Technical Report No. 435, Proceedings of the International Conference on Computer Vision, Bombay, India, Jan. 4-7, 1998 (pp. 1-8).

* cited by examiner

*Primary Examiner* — Amir Alavi
(74) *Attorney, Agent, or Firm* — Blank Rome LLP (57) ABSTRACT

A video analysis apparatus may include a generating unit to generate at least one spatiotemporal pattern by performing pixel sampling on a plurality of frames in an input video, an extracting unit to extract at least one region of interest having a sinusoidal pattern from the at least one spatiotemporal pattern, and an analysis unit to perform a frequency analysis of the at least one region of interest to determine whether the input video includes a predetermined type of content.

17 Claims, 11 Drawing Sheets

METHOD AND APPARATUS FOR ANALYZING VIDEO BASED ON SPATIOTEMPORAL PATTERNS

CROSS-REFERENCE TO RELATED APPLICATION

This application claims the priority benefit of Korean Patent Application No. 10-2013-0022361, filed on Feb. 28, 2013, in the Korean Intellectual Property Office, the disclosure of which is incorporated herein by reference.

BACKGROUND

1. Field of the Invention

Exemplary embodiments relate to a method and system for detecting a periodic motion based on spatiotemporal patterns, and more particularly, to a method and system for determining whether an input video includes a predetermined type of content through frequency analysis of at least one region of interest.

2. Description of the Related Art

As use of electronic devices, for example, smart phones, tablet computers, and the like, is currently becoming more widespread, users of electronic devices may access media contents, for example, moving pictures or videos, with ease via an Internet connection. Also, with the rapid growth of social media, for example, You Tube, Myspace, Facebook, and the like, the users may upload and share the media contents easily.

As such, growth of symantic indexing or tagging is required to find or recognize a special object such as, for example, a person, a tree, a building, an animal, and the like, in media contents. Also, in addition to useful media contents, a great number of media contents in social media include harmful media contents, for example, adult contents.

Accordingly, there is a demand for recognizing and sorting a special object or a harmful media content such as, for example, an adult content, from media contents uploaded to the web.

SUMMARY

According to an aspect of the present invention, there is provided a video analysis apparatus including a generating unit to generate at least one spatiotemporal pattern by performing pixel sampling on a plurality of frames in an input video, an extracting unit to extract at least one region of interest having a sinusoidal pattern from the at least one spatiotemporal pattern, and an analysis unit to perform a frequency analysis of the at least one region of interest to determine whether the input video includes a predetermined type of content.

The generating unit may generate the at least one spatiotemporal pattern by sampling the plurality of frames in at least one predetermined direction along a time axis.

The generating unit may generate the at least one spatiotemporal pattern by executing scene-cut through at least one of color histogram analysis and color correlation analysis of the plurality of frames.

The generating unit may generate the at least one spatiotemporal pattern by executing scene-cut based on continuity of the at least one spatiotemporal pattern.

The extracting unit may include a segmenting unit to generate a plurality of partial spatiotemporal patterns by segmenting each of the at least one spatiotemporal pattern based on a first time length, a clustering unit to generate a segmentation map by a region segmentation from a first partial spatiotemporal pattern among the plurality of partial spatiotemporal patterns, and a region of interest extracting unit to extract the at least one region of interest from the segmentation map.

The region of interest extracting unit may extract a plurality of bounding boxes including each of boundaries of the segmentation map obtained by edge detection, region growing, clustering, and so on, and may select at least one bounding box satisfying a predetermined condition as the at least one region of interest.

The analysis unit may include a first transforming unit to transform the at least one region of interest into a one-dimensional signal to generate a first signal, a second transforming unit to transform the first signal to a frequency domain to generate a second signal, and a determining unit to determine whether the input video includes the predetermined type of content by analyzing a frequency distribution of the second signal.

The first transforming unit may generate the first signal by applying a correlation function to the at least one region of interest.

The analysis unit may determine that the input video includes the predetermined type of content when a dominant frequency in the frequency distribution of the second signal is within a predetermined frequency range.

The determining unit may determine whether the input video includes the predetermined type of content by analyzing color information of the at least one region of interest and its neighboring region.

According to another aspect of the present invention, there is provided a video analysis method including generating at least one spatiotemporal pattern by performing pixel sampling on a plurality of frames in an input video, extracting at least one region of interest having a sinusoidal pattern from the at least one spatiotemporal pattern, and performing a frequency analysis of the at least one region of interest to determine whether the input video includes a predetermined type of content.

The generating may include generating the at least one spatiotemporal pattern by sampling the plurality of frames in at least one predetermined direction along a time axis.

The generating may include generating the at least one spatiotemporal pattern by executing scene-cut through at least one of color histogram analysis and color correlation analysis of the plurality of frames, and generating the at least one spatiotemporal pattern by executing scene-cut based on continuity of the at least one spatiotemporal pattern.

The extracting may include generating a plurality of partial spatiotemporal patterns by segmenting each of the at least one spatiotemporal pattern based on a first time length, generating a segmentation map by a region segmentation from a first partial spatiotemporal pattern among the plurality of partial spatiotemporal patterns, and extracting the at least one region of interest from the segmentation map.

The extracting of the region of interest may include extracting a plurality of bounding boxes including each of boundaries of the segmentation map, and selecting at least one bounding box satisfying a predetermined condition as the at least one region of interest.

The analyzing may include transforming the at least one region of interest into a one-dimensional signal to generate a first signal, transforming the first signal to a frequency domain to generate a second signal, and determining whether the input video includes the predetermined type of content by analyzing a frequency distribution of the second signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein.

The examples used herein are intended merely to facilitate an understanding of manners in which the embodiments herein can be practiced and to further enable those of skill in the art to practice the embodiments herein. Accordingly, the examples should not be construed as limiting the scope of the embodiments herein. Like reference numerals refer to the like elements throughout.

Figure 1:
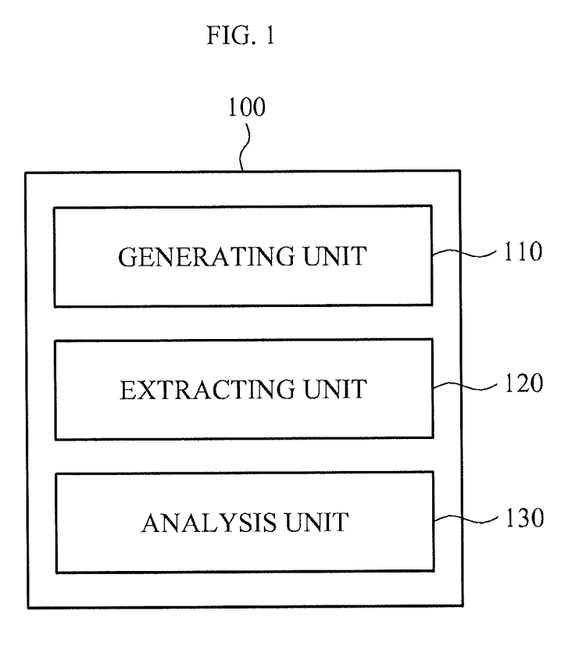
FIG. 1 is a block diagram illustrating a video analysis apparatus according to an exemplary embodiment.

FIG. 1 is a block diagram illustrating a video analysis apparatus 100 according to an exemplary embodiment. The video analysis apparatus 100 may include a generating unit to 110, an extracting unit 120, and an analysis unit 130.

According to an exemplary embodiment, the video analysis apparatus 100 may determine whether a plurality of media contents uploaded to a social media include a predetermined type of content. The predetermined type of content may correspond to a harmful media content, for example, an adult content.

The video analysis apparatus 100 according to an exemplary embodiment may perform symantic indexing or filtering to detect a periodic motion in the harmful media content such as an adult content. When a periodic motion is found in an input video or the media content, a sinusoidal pattern may be detected in a spatiotemporal pattern. To detect the sinusoidal pattern, the spatiotemporal pattern may be segmented into a region including the sinusoidal pattern and a region free of the sinusoidal pattern.

According to an exemplary embodiment, an input video including a media content, for example, a video, may be input to the video analysis apparatus 100. The generating unit 110 of the video analysis apparatus 100 may generate at least one spatiotemporal pattern by performing pixel sampling on a plurality of frames in the input video. Also, the generating unit 110 may generate the at least one spatiotemporal pattern by sampling the plurality of frames in at least one predetermined direction along a time axis. A further description of the at least one predetermined direction is provided with reference to FIG. 4.

According to an exemplary embodiment, the extracting unit 120 of the video analysis apparatus 100 may extract at least one region of interest including a sinusoidal pattern from the at least one spatiotemporal pattern generated. A further description of the extracting unit 120 is provided with reference to FIG. 2.

The analysis unit 130 according to an exemplary embodiment may perform frequency analysis on the at least one region of interest. The analysis unit 130 may determine whether the input video includes a predetermined type of content through the frequency analysis.

The predetermined type of content may include a harmful media content, for example, an adult content, however, is not limited to a specific type of media content, and may include a media content including a predetermined object or element desired for a user to detect.

According to an exemplary embodiment, the at least one region of interest may correspond to an area including the sinusoidal pattern. The analysis unit 130 may analyze the sinusoidal pattern in the at least one region of interest extracted by the extracting unit 120, and may transform the sinusoidal pattern into a one-dimensional signal to generate a first signal. The analysis unit 130 may analyze the first signal as a one-dimensional signal in a frequency domain to detect a periodic motion in the input video. A further description of the analysis unit 130 is provided with reference to FIG. 3.

Figure 2:
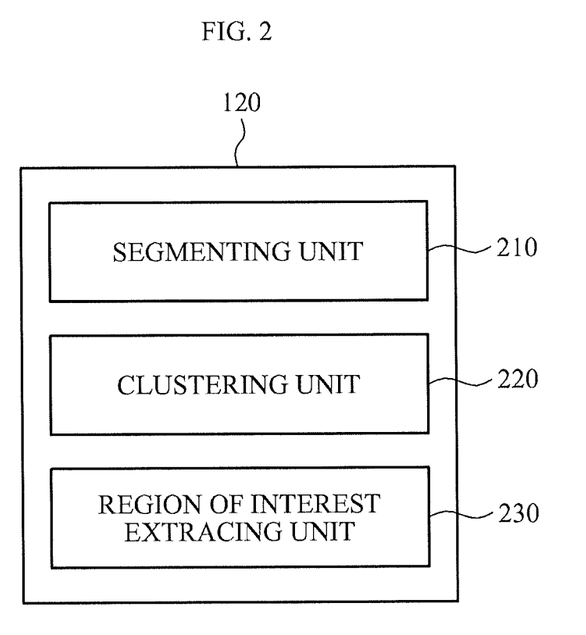
FIG. 2 is a block diagram illustrating an extracting unit of a video analysis apparatus according to an exemplary embodiment.

FIG. 2 is a block diagram illustrating the extracting unit 120 of the video analysis apparatus 100 according to an exemplary embodiment. The extracting unit 120 may include a segmenting unit 210, a clustering unit 220, and a region of interest extracting unit 230. The segmenting unit 210 of the extracting unit 120 may generate a plurality of partial spatiotemporal patterns by segmenting each of the at least one spatiotemporal pattern based on a first time length that may be preset or calculated using scene-cut.

The clustering unit 220 according to an exemplary embodiment may generate a segmentation map by a region segmentation from a first partial spatiotemporal pattern among the plurality of partial spatiotemporal patterns, for example, the region segmentation may be performed by grouping similar color pixels from the first partial spatiotemporal pattern. The region of interest extracting unit 230 may extract the at least one region of interest from the segmentation map.

The region of interest extracting unit 230 according to an exemplary embodiment may extract a plurality of bounding boxes including each of boundaries of the segmentation map, and may select at least one bounding box satisfying a predetermined condition as the at to least one region of interest. A related disclosure is described in further detail with reference to FIG. 6.

Figure 3:
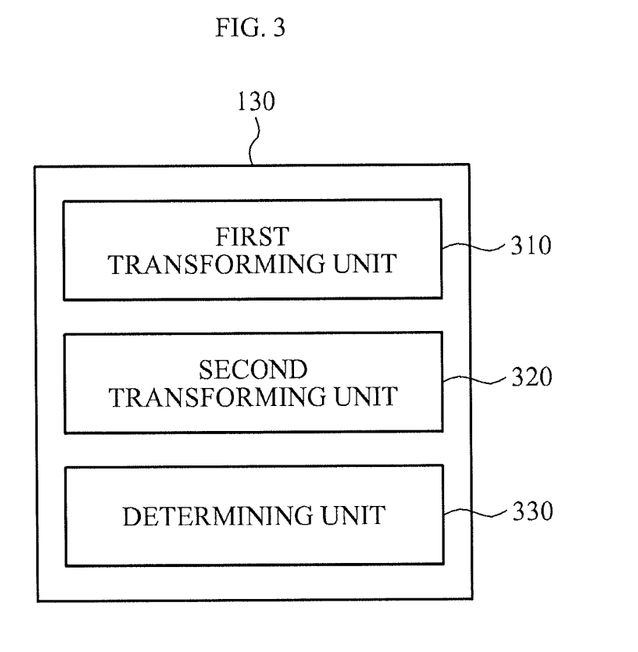
FIG. 3 is a block diagram illustrating an analysis unit of a video analysis apparatus according to an exemplary embodiment.

FIG. 3 is a block diagram illustrating the analysis unit 130 of the video analysis apparatus 100 according to an exemplary embodiment. The analysis unit 130 may include a first transforming unit 310, a second transforming unit 320, and a determining unit 330.

According to an exemplary embodiment, the first transforming unit 310 may transform the at least one region of interest extracted by the region of interest extracting unit 230 of the extracting unit 120 into a one-dimensional signal to generate a first signal. The at least one region of interest extracted from the spatiotemporal pattern of the input video may correspond to a two-dimensional signal. Accordingly, the first transforming unit 310 may transform the at least one region of interest as a two-dimensional signal into a one-dimensional signal.

The second transforming unit 320 of the analysis unit 130 may transform the first signal transformed as a one-dimensional signal by the first transforming unit 310 to a frequency domain to generate a second signal. The first signal may correspond to a signal associated with a time domain, and may be transformed by the second transforming unit 320 to a second signal corresponding to a signal associated with a frequency domain.

According to an exemplary embodiment, the determining unit 330 of the analysis unit 130 may determine whether the input video includes a predetermined type of content through analysis of a frequency distribution of the second signal.

The predetermined type of content may correspond to a media content including a sinusoidal pattern in a spatiotemporal pattern. As described in the foregoing, the predetermined type of content may correspond to a harmful media content, for example, an adult content. A related disclosure is described in further detail with reference to FIGS. 7 through 10.

According to an exemplary embodiment, the determining unit 330 may extract color information from the at least one spatiotemporal pattern, and if the color information is within a predetermined color range, may determine that the input video includes the predetermined type of content.

Figure 4:
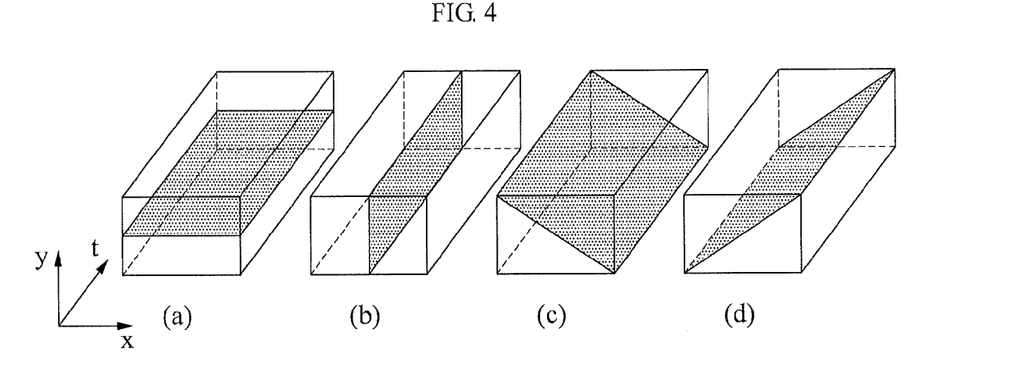
FIG. 4 is a diagram illustrating a pixel sampling direction of a spatiotemporal pattern according to an exemplary embodiment.

FIG. 4 is a diagram illustrating a pixel sampling direction of a spatiotemporal pattern according to an exemplary embodiment.

To detect a predetermined periodic motion in the input video, a spatiotemporal pattern of the input video may be used. The spatiotemporal pattern may be obtained by collecting a set of results produced by performing pixel sampling on each frame along a time axis.

According to an exemplary embodiment, when a pixel of a location (x, y) at a time t in the input video V has a pixel value $f_v(x, y, t)$, the input video V may be represented by Equation 1.

$$V=\{f_v(x,y,t)\}, x,y,t \in \{0, 1, 2, \ldots\}.$$  [Equation 1]

Here, a spatiotemporal pattern $f_{ST}$ of the video V may be represented by Equation 2

$$f_{ST}(z,t)=f_v(x(z),y(z),t),$$  [Equation 2]

Here, $x(z)$ and $y(z)$ denote a one-dimensional function of an independent integer parameter z. The spatiotemporal pattern may generated by sampling a pixel group in each frame and by collecting the samples temporally along with the time. Accordingly, the spatiotemporal pattern may denote two-dimensional abstraction of a three-dimensional video.

Also, various types of patterns may be obtained depending on methods of mapping $x(z)$ and $y(z)$. For example, an equation such as, $(x(z), y(z))=(z, y_0)$ or $(x(z), y(z))=(x_0, z)$, may be used to perform horizontal or vertical pixel sampling on an arbitrary plane such as, for example, $y=y_0$ or $x=x_0$ in which $y_0$ and $x_0$ are constant. Also, diagonal pixel sampling for a predetermined number α may be obtained by a method of $(x(z), y(z))=(z, \alpha z)$.

According to an exemplary embodiment, the spatiotemporal pattern may include a visual property for distinguishing and classifying the input video based on multiple types of video effects, for example, cuts, wipes, dissolves, fades, camera motions, object motions, flashlights, and zooms. Herein, for convenience and ease of description, the description focuses on the periodic motion using spatiotemporal patterns in four directions suitable for most of motions.

(a) through (d) in FIG. 4 illustrate examples of spatiotemporal patterns in four directions. A spatiotemporal pattern (a) of FIG. 4 illustrates an example of a spatiotemporal pattern in a horizontal direction, a spatiotemporal pattern (b) of FIG. 4 illustrates an example of a spatiotemporal pattern in a vertical direction, and a spatiotemporal pattern (c) and a spatiotemporal pattern (d) of FIG. 4 illustrate examples of spatiotemporal patterns in two diagonal directions. The spatiotemporal patterns may be configured two-dimensional (2D) including information associated with sampling and a time axis of the input video.

Figure 5:
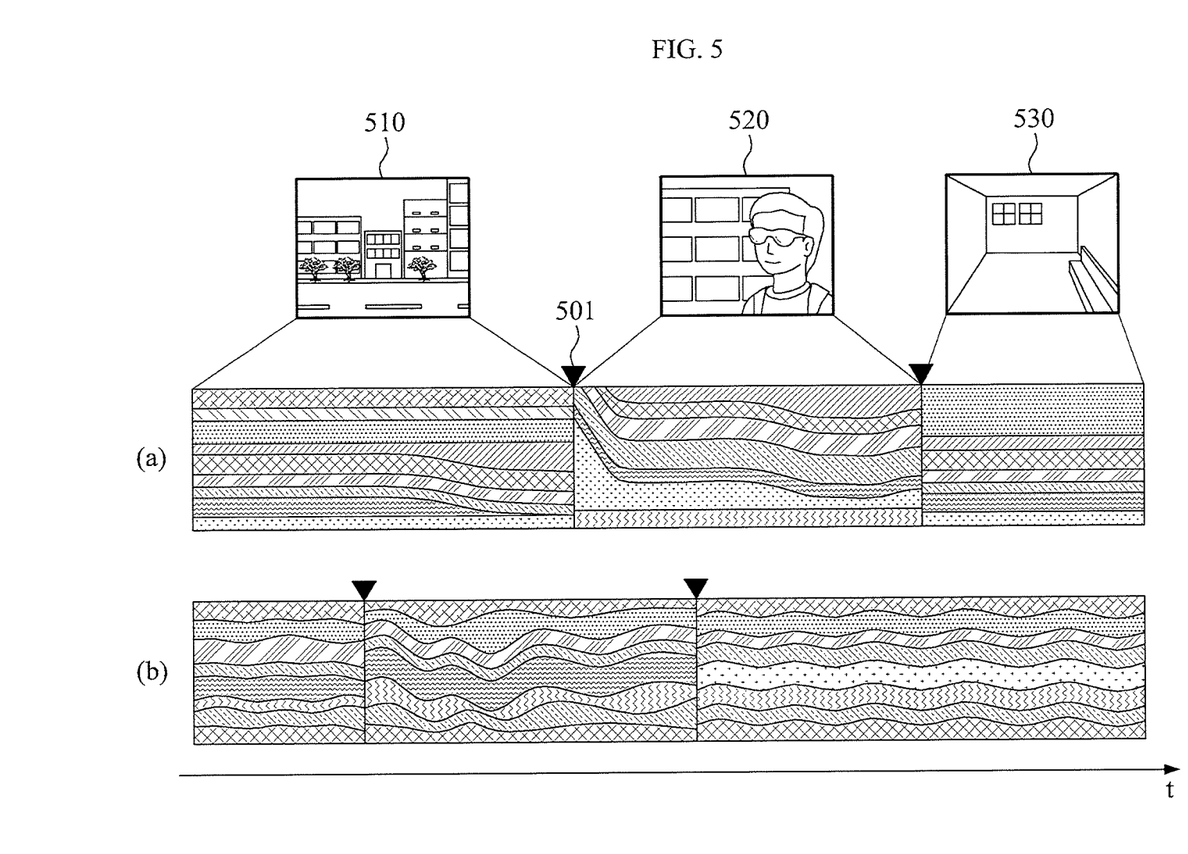
FIG. 5 is a diagram illustrating a spatiotemporal pattern of a non-periodic motion and a spatiotemporal pattern of a periodic motion in a predetermined sampling direction according to an exemplary embodiment.

FIG. 5 is a diagram illustrating a spatiotemporal pattern of a non-periodic motion and a spatiotemporal pattern of a periodic motion in a predetermined sampling direction according to an exemplary embodiment. A spatiotemporal pattern (a) of FIG. 5 illustrates spatiotemporal patterns of scenes, such as 510, 520, and 530, which does not contain periodic motions, wherein only an edge 501 may occur to the spatiotemporal image pattern in a horizontal direction along a time axis.

A spatiotemporal pattern (b) of FIG. 5 illustrates a scene containing a periodic motion through sampling in at least one direction among the predetermined four directions described with reference to FIG. 4. As shown in the spatiotemporal pattern (b) of FIG. 5, the sinusoidal pattern looking like a one-dimensional sinusoidal signal may be observed in the spatiotemporal pattern.

Also, as shown in FIG. 5, a scene transition may occur in the spatiotemporal pattern. Accordingly, it may be easy to detect the periodic motion in each scene. The generating unit 110 of the video analysis apparatus 100 may generate at least one spatiotemporal pattern by executing scene-cut through comparing intensity histograms of the plurality of frames. Also, the generating unit 110 may generate the at least one spatiotemporal pattern for each scene by executing scene-cut based on continuity of the at least one spatiotemporal pattern.

Figure 6:
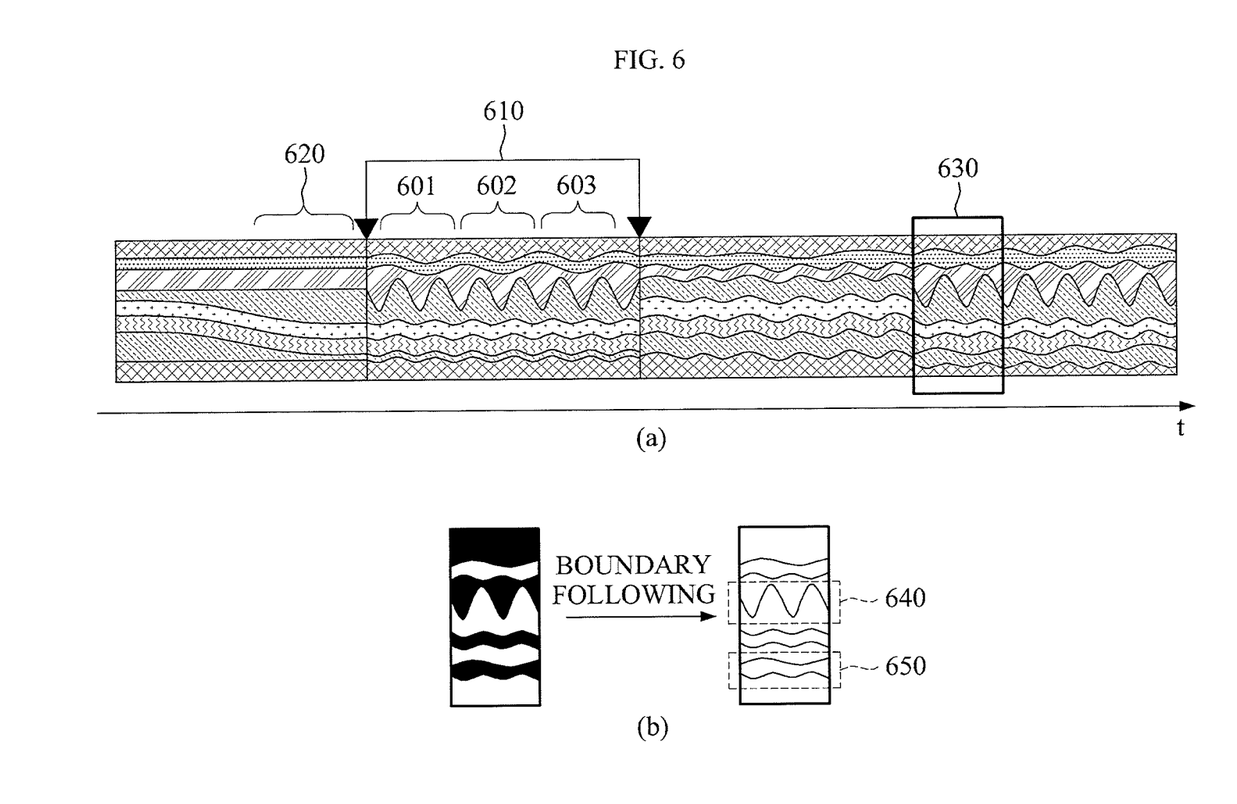
FIG. 6 is a diagram illustrating an example of extracting a region of interest using clustering according to an exemplary embodiment.

FIG. 6 is a diagram illustrating an example of extracting a region of interest using clustering according to an exemplary embodiment.

Since the spatiotemporal pattern has various horizontal lengths over time in a scene, the segmenting unit 210 of the extracting unit 120 may generate a plurality of partial spatiotemporal patterns by segmenting the spatiotemporal pattern based on first time lengths 601, 602, and 603, that is, a fixed interval of a size N, to prevent scenes from overlapping. Herein, for convenience and ease of description, in a case in which the first time length N is 64, when a length of a scene is less than N, the corresponding scene may be overlooked.

According to an exemplary embodiment, the spatiotemporal pattern may include a portion 610 in which a periodic motion is present and a portion 620 in which the periodic motion is absent as shown in FIG. 6, and accordingly, it may be important to segment a region of interest. Also, a one-dimensional sinusoidal pattern may occur at a boundary between regions containing different colors as shown in FIG. 6, and accordingly, the region of interest may be extracted by analyzing the boundary.

According to an exemplary embodiment, a color area may be identified using a k-means clustering method. The clustering method may be performed roughly since just a region containing a one-dimensional sinusoidal pattern is needed. Color clustering may group pixels of a spatiotemporal image into k sets $S=\{s_1, s_2, \ldots, s_k\}$. Accordingly, this algorithm may be implemented as an object function such as, for example, Equations 3 and 4.

$$\underset{S}{\operatorname{argmin}} \sum_{j=1}^{k} \sum_{x_i \in s_j} D(x_i, c_j),$$  [Equation 3]

$$D(x_i, c_j) \triangleq |x_i^R - c_j^R| + |x_i^G - c_j^G| + |x_i^B - c_j^B|,$$  [Equation 4]

Here, $(c_j^R, c_j^G, c_j^B)$ denotes red, green, and blue color components from the centroid of a cluster $s_j$, respectively, and $(X_i^R, x_i^G, x_i^B)$ denotes red, green, and blue color components from the cluster centroid of a pixel $x_i$, respectively. Here, a segmentation map may be generated for each cluster by the clustering unit 220, and the region of interest extracting unit 230 may extract the at least one region of interest from the segmentation map using a simple boundary extracting method.

(b) of FIG. 6 illustrates an example of extracting at least one region of interest after generating a segmentation map of a spatiotemporal pattern 630 having the first time length N in a spatiotemporal pattern of (a) of FIG. 6.

According to an exemplary embodiment, eight-connected component labeling may be performed for each segmentation map. The region of interest extracting unit 230 may extract a plurality of bounding boxes 640 and 650 including each boundary of the segmentation map for each element of the connected boundary pixels. The plurality of bounding boxes may have a minimum height. For example, when the height of the bounding box is less than 5% of a height of the spatiotemporal pattern image or when a width of the bounding box is less than half of a width of the spatiotemporal pattern, a probability that the periodic motion to be determined will be detected may be so low as to be neglected.

In (b) of FIG. 6, the bounding box 640 is illustrated as having a height greater than the minimum height and a width greater than a half of the width of the spatiotemporal pattern, and may be selected as the region of interest. In contrast, the bounding box 650 is illustrated as having a height less than the minimum height and a width less than a half of the width of the spatiotemporal pattern, and may be overlooked. Accordingly, the region of interest extracting unit 230 may extract the at least one region of interest including a one-dimensional sinusoidal signal in each spatiotemporal area.

Figure 7:
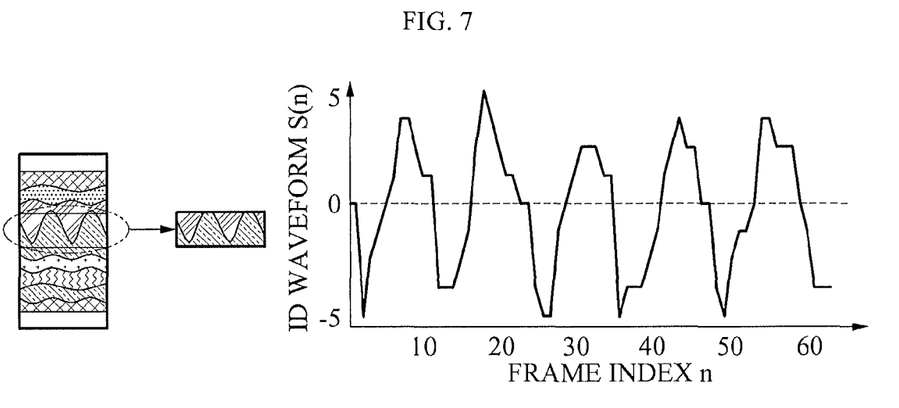
FIG. 7 is a diagram illustrating a one-dimensional waveform obtained using vertical correlation according to an exemplary embodiment.

FIG. 7 is a diagram illustrating a one-dimensional waveform obtained using vertical correlation according to an exemplary embodiment. As described in the foregoing, the at least one region of interest including the one-dimensional sinusoidal pattern may be extracted by the extracting unit 120. However, the periodic motion may be difficult to be detected in a two-dimensional image. Accordingly, the first transforming unit 310 may transform the at least one region of interest as a two-dimensional image into a first signal as a one-dimensional signal.

Here, when a pixel (x, y) has an intensity value q(x, y) in the region of interest, a vertical window of each frame index n may be represented by Equation 5.

$$w_n = \{q(n,0), q(n,1), \ldots, q(n, M-1)\},$$  [Equation 5]

Here, M denotes a height of a region of interest. The periodic motion may be calculated by comparing sums of absolute difference (SAD) of consecutive frames. Accordingly, the first signal S(n) as a one-dimensional signal may be represented by Equation 6.

$$S(n) = \underset{m}{\operatorname{argmin}} \frac{1}{M} \sum_{j=0}^{M-1} |w_n[j] - w_{n-1}[j-m]|,$$  [Equation 6]

$$(-M/3 < m < M/3)$$

$$(0 \le n < N - 1)$$

Here, N denotes the first time length, and m denotes an index of a row of the at least one region of interest. This algorithm may have an advantage of maintaining an actual sinusoidal signal without aligning moving objects by compensating the objects' motions through consecutive frames as shown in FIG. 7, as well as periodicity of the spatiotemporal image. As described in the foregoing, FIG. 7 illustrates an example of a waveform of the first signal as a one-dimensional signal.

Figure 8:
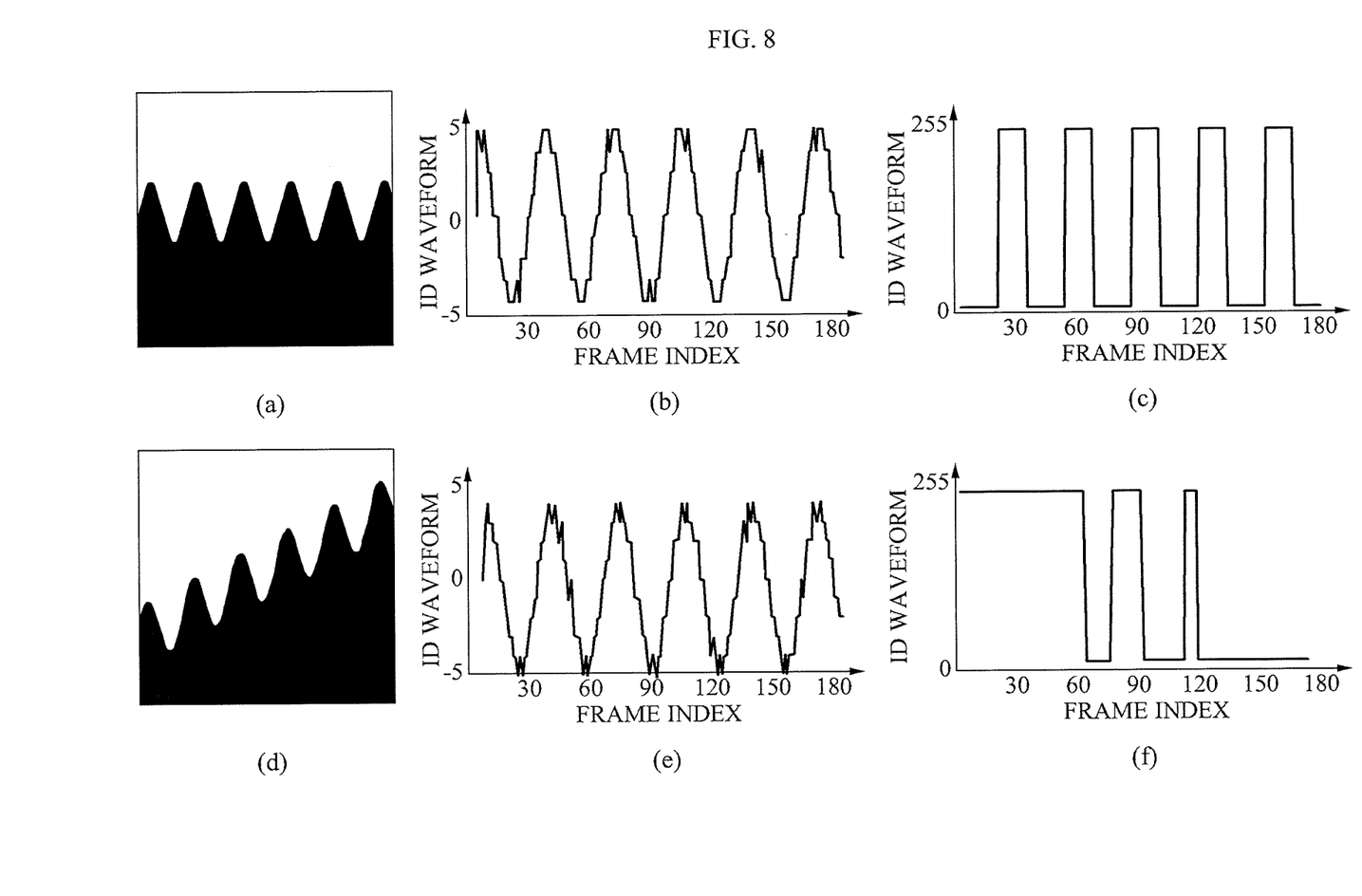
FIG. 8 is a diagram illustrating a one-dimensional waveform obtained from a synthesized spatiotemporal pattern according to an exemplary embodiment.

FIG. 8 is a diagram illustrating a one-dimensional waveform obtained from a synthesized spatiotemporal pattern according to an exemplary embodiment. As described with reference to FIG. 7, the one-dimensional signal clearly shows a regular sinusoidal wave, irrespective of a slope of a sinusoidal wave in the spatiotemporal pattern. FIG. 8 illustrates a result of comparison of a difference in intensity through a process of FIG. 8 and a horizontal scan line in an image for an arbitrary spatiotemporal pattern.

According to an exemplary embodiment, the first signal as a one-dimensional signal may not look like a sinusoidal signal due to noise. Accordingly, to obtain a better waveform, an autocorrelation function may be used. The autocorrelation function S(n) may be defined by Equation 7.

$$R(l) = \frac{1}{N-1} \sum_{n=0}^{N-2} S(n) \cdot S(n+l),$$  [Equation 7]

Here, N−1 denotes a length of S(n). In Equation 7, a value of R(l) may increase as S(n) and S(n+1) become more correlated along with the l.

Accordingly, when S(n) includes periodicity even though noise exists, an enhanced sinusoidal waveform having the same cycle may be obtained through Equation 7. Since 15% of a correlation signal at the left and right has insufficient information, the length of R(l) may be changed from N to L corresponding to 70% of N size. Accordingly, when the autocorrelation function is used, a shape of a waveform may be enhanced.

Figure 9:
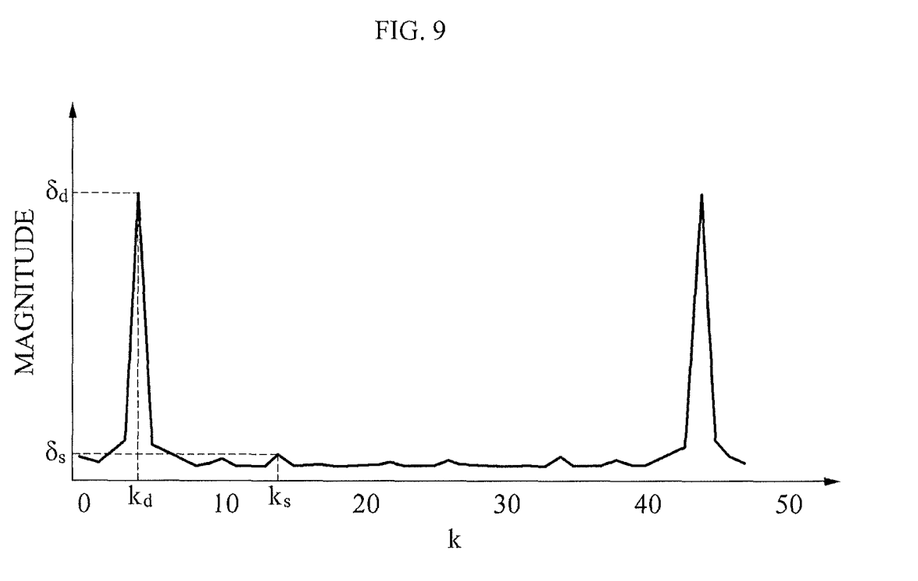
FIG. 9 is a diagram illustrating a magnitude of frequency response using a discrete Fourier transform according to an exemplary embodiment.

FIG. 9 is a diagram illustrating a magnitude of frequency response using a discrete Fourier transform according to an exemplary embodiment.

According to an exemplary embodiment, the first transforming unit 310 of the analysis unit 130 may transform the at least one region of interest into a one-dimensional signal to generate the first signal. Also, the second transforming unit 320 may transform the first signal to a frequency domain to generate the second signal.

A signal including the sinusoidal pattern may be represented by a combination of frequencies. Also, the signal including the sinusoidal pattern may include a dominant frequency corresponding to a cycle of a sinusoidal wave. Accordingly, to measure the periodicity, an autocorrelation signal may be transformed to a frequency domain through discrete Fourier transform represented by Equation 8.

$$F(k) = \sum_{l=0}^{L-1} R(l) \cdot e^{-j2\pi k l/L}, \quad \text{[Equation 8]}$$

Here, R(l) denotes an autocorrelation function of a one-dimensional waveform. As shown in FIG. 9, a discrete Fourier transform may be symmetrical with respect to a point of L/2, and may use only half of a corresponding frequency. To detect the periodic motion, analysis may be performed in the frequency domain using various methods.

According to an exemplary embodiment, as shown in FIG. 9, a frequency location corresponding to a peak having a highest magnitude in a frequency domain may be placed in a predetermined frequency range, and the peak having a highest magnitude may be compared to a peak having a next highest magnitude. When a magnitude of each peak is $\delta_d$ and $\delta_s$, the periodic motion may be defined using Equation 9.

$$Ratio_{peak} = \frac{\delta_2}{\delta_d}. \quad \text{[Equation 9]}$$

When $Ratio_{peak}$ is less than a threshold value, there is a probability that the periodic motion is present.

According to another exemplary embodiment, the frequency may be classified into a dominant sinusoidal frequency and a noise frequency. In this instance, a Gaussian mixture model may be used to analyze a distribution of a magnitude of frequency response. Corresponding data may be represented by a sum of K normal distribution as in Equation 10.

$$P(x \mid \theta) = \sum_{k=1}^{K} \lambda_k Norm_x[\mu_k, \sigma_k], \quad \text{[Equation 10]}$$

Here, x denotes a magnitude of frequency response, and each of $\mu_{1...K}$ and $\sigma_{1...K}$ denotes the means of normal distributions and the variances of normal distributions, respectively. Also, $\lambda_{1...K}$ denotes a weight value for summing to one. The Gaussian mixture model may simplify a complex probability distribution into a mixture of distributions. An expectation maximization (EM) algorithm may be executed to obtain a maximum likelihood for calculating a parameter value of the Gaussian mixture model, for example, a mean, a variance, and a weight, with respect to the magnitude of frequency response. In the EM algorithm, the parameter value of the Gaussian mixture model may be obtained through iterative updating as represented in Equation 11.

$$r_{ik} = \frac{\lambda_k Norm_{x_i}[\mu_k, \sigma_k]}{\sum_{j=1}^{K} \lambda_j Norm_{x_i}[\mu_j, \sigma_j]} \quad \text{[Equation 11]}$$

$$\lambda_k^{[t-1]} = \frac{\sum_{i=1}^{I} r_{ik}}{\sum_{j=1}^{K} \sum_{i=1}^{I} r_{ik}}$$

$$\mu_k^{[t-1]} = \frac{\sum_{i=1}^{I} r_{ik} x_i}{\sum_{i=1}^{I} r_{ik}}$$

$$\sigma_k^{[t-1]} = \frac{\sum_{i=1}^{I} r_{ik}(x_i - \mu_k^{[t-1]})^2}{\sum_{i=1}^{I} r_{ik}}$$

Here, I denotes a total number of magnitudes of frequency response, and t denotes a number of iterations. The iteration may continue until a log likelihood converges. A Gaussian having a highest weight may be selected and a mean $\mu_m$ and a variance $\sigma_m$ of the corresponding Gaussian may be obtained, and the average and the variance may be used as a feature point of a periodic motion.

Figure 10:
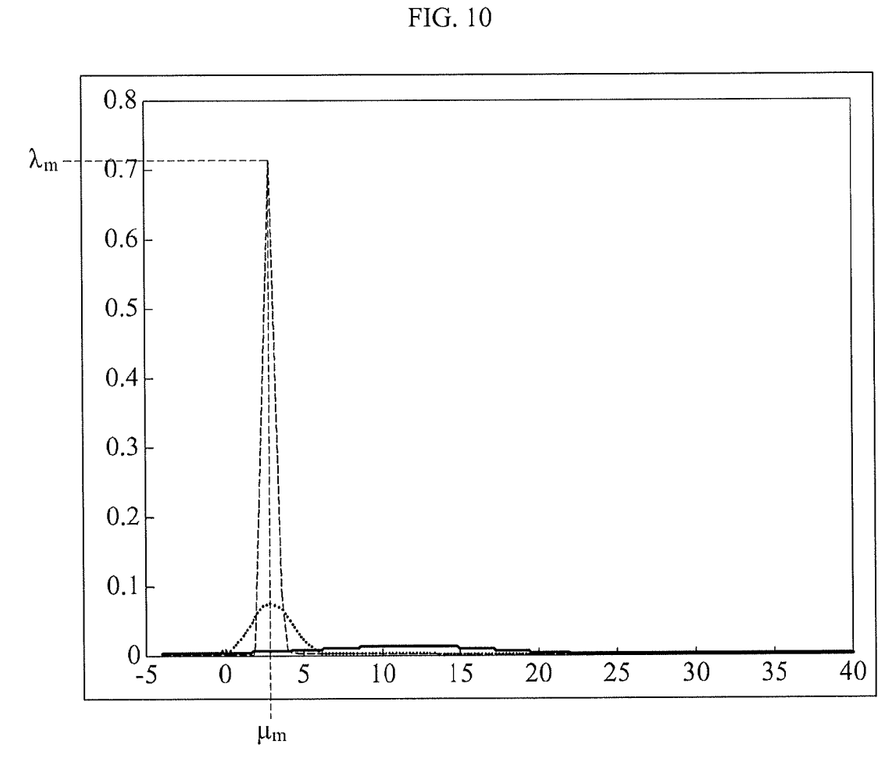
FIG. 10 is a diagram illustrating a result produced by fitting a Gaussian mixture model to the waveform of FIG. 8 according to an exemplary embodiment.

FIG. 10 is a diagram illustrating a result produced by fitting a Gaussian mixture model to the waveform of FIG. 8 according to an exemplary embodiment. Also, FIG. 10 illustrates a result of executing the Gaussian mixture model based on the magnitude of frequency response, as described in the foregoing.

According to an exemplary embodiment, a periodic motion may appear in an image including various motions, for example, walking, running, and the like, as well as a harmful media content such as, for example, an adult content. When a portion including a sinusoidal pattern in an input video corresponds to a hand or a face, an area including a sinusoidal pattern in a spatiotemporal pattern may include a skin color, but an area other than the area including the sinusoidal pattern may hardly include a skin color. In a case of a harmful media content such as, for example, an adult content, periodic motion analysis described in the foregoing and color analysis of an area including a sinusoidal wave and an area other than the area including the sinusoidal wave may be performed to determine whether a media content includes a predetermined type of content.

According to an exemplary embodiment, in a case of a harmful media content such as, for example, an adult content, a great amount of skin color may be included in a portion in which a periodic motion is absent, as well as a portion including a periodic motion. Accordingly, the harmful media content may be sorted using hue and saturation information of at least one region of interest and hue and saturation information of its neighboring region.

Figure 11:
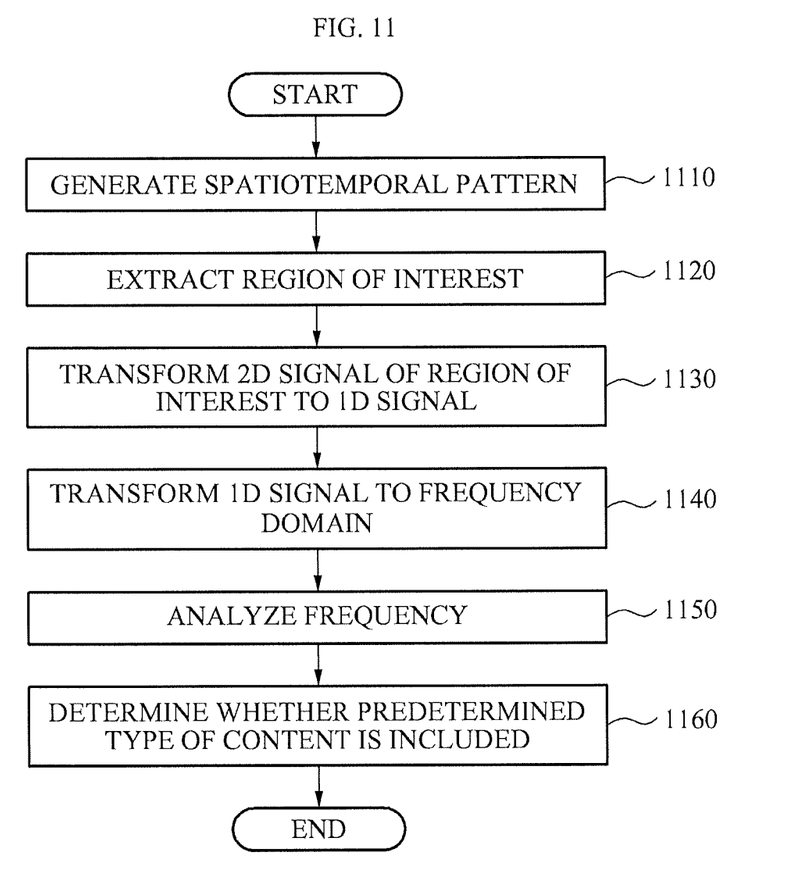
FIG. 11 is a flowchart illustrating a video analysis method according to an exemplary embodiment.

FIG. 11 is a flowchart illustrating a video analysis method according to an exemplary embodiment. An input video may be input to the video analysis apparatus 100. In operation 1110, the generating unit 110 may generate at least one spatiotemporal pattern by performing pixel sampling on a plurality of frames in the input video. Also, the generating unit 110 may generate the at least one spatiotemporal pattern by sampling the plurality of frames in at least one predetermined direction along a time axis.

In operation 1120, at least one region of interest including a sinusoidal pattern may be extracted from the at least one spatiotemporal pattern. The extracting of the region of interest may include generating a plurality of partial spatiotemporal patterns by segmenting each of the at least one spatiotemporal pattern based on a first time length N. Next, a segmentation map may be generated by a region segmentation from a first partial spatiotemporal pattern among the plurality of partial spatiotemporal patterns, and the at least one region of interest may be extracted from the segmentation map.

According to an exemplary embodiment, to extract the region of interest, the region of interest extracting unit 230 may extract a plurality of bounding boxes including each of boundaries of the segmentation map, and may select at least one bounding box satisfying a predetermined condition as the at least one region of interest. As described in the foregoing, the predetermined condition may correspond to a minimum height of the bounding box.

For example, the predetermined condition may correspond to whether the minimum height of the bounding box is greater or less than 5% of a height of the spatiotemporal pattern image, however, the predetermined condition is not limited in this regard. When the height of the bounding box is less than 5% of the height of the spatiotemporal pattern image or when a width of the bounding box is less than a half of a width of the spatiotemporal pattern, a probability that the periodic motion to be determined will be detected may be so low as to be neglected.

According to an exemplary embodiment, in operation 1130, the first transforming unit 310 may transform a two-dimensional signal of the at least one region of interest extracted by the extracting unit 120 into a first signal as a one-dimensional signal. In operation 1140, the second transforming unit 320 may transform the first signal to a frequency domain to generate a second signal. In operation 1150, the determining unit 330 may analyze a frequency distribution of the second signal, and in operation 1160, may determine whether the input video includes a predetermined type of content.

According to an exemplary embodiment, as described in the foregoing, a color feature for detecting a human behavior may be obtained by calculating hue and saturation in the at least one region of interest and its neighboring region. Finally, a human behavior may be detected based on the periodic motion feature and/or the color feature.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A video analysis apparatus comprising:
   a generating means to generate at least one spatiotemporal pattern by performing pixel sampling on a plurality of frames in an input video;
   a clustering means to generate a segmentation map using a first spatiotemporal pattern of the at least one spatiotemporal pattern;
   a region of interest extracting means to extract the at least one region of interest having a sinusoidal pattern from the segmentation map; and
   an analysis means to perform a frequency analysis of the at least one region of interest to determine whether the input video includes a predetermined type of content.

2. The video analysis apparatus of claim 1, wherein the generating means generates the at least one spatiotemporal pattern by sampling the plurality of frames in at least one predetermined direction along a time axis.

3. The video analysis apparatus of claim 1, wherein the generating means generates the at least one spatiotemporal pattern by executing scene-cut through at least one of color histogram analysis and color correlation analysis of the plurality of frames.

4. The video analysis apparatus of claim 1, wherein the generating means generates the at least one spatiotemporal pattern by executing scene-cut based on continuity of the at least one spatiotemporal pattern.

5. The video analysis apparatus of claim 1 further comprising:

a segmenting means to generate a plurality of partial spatiotemporal patterns by segmenting each of the at least one spatiotemporal pattern based on a first time length,
wherein the clustering means generates the segmentation map by a region segmentation from a first partial spatiotemporal pattern among the plurality of partial spatiotemporal patterns.

6. The video analysis apparatus of claim 1, wherein the region of interest extracting means extracts a plurality of bounding boxes including each of boundaries of the segmentation map, and selects at least one bounding box satisfying a predetermined condition as the at least one region of interest.

7. The video analysis apparatus of claim 1, wherein the analysis means comprises:
a first transforming means to transform the at least one region of interest into a one dimensional signal to generate a first signal;
a second transforming means to transform the first signal to a frequency domain to generate a second signal; and
a determining means to determine whether the input video includes the predetermined type of content by analyzing a frequency distribution of the second signal.

8. The video analysis apparatus of claim 7, wherein the first transforming means generates the first signal by applying a correlation function to the at least one region of interest.

9. The video analysis apparatus of claim 7, wherein the analysis means determines that the input video includes the predetermined type of content when a dominant frequency in the frequency distribution of the second signal is within a predetermined frequency range.

10. The video analysis apparatus of claim 1, wherein the determining means determines whether the input video includes the predetermined type of content by analyzing color information of the at least one region of interest and a region other than the at least one region of interest.

11. A video analysis method comprising:
generating at least one spatiotemporal pattern by performing pixel sampling on a plurality of frames in an input video;
generating a segmentation map using a first spatiotemporal pattern of the at least one spatiotemporal pattern;
extracting at least one region of interest having a sinusoidal pattern from the segmentation map; and
performing a frequency analysis of the at least one region of interest to determine whether the input video includes a predetermined type of content.

12. The video analysis method of claim 11, wherein generating at least one spatiotemporal pattern comprises generating the at least one spatiotemporal pattern by sampling the plurality of frames in at least one predetermined direction along a time axis.

13. The video analysis method of claim 11, wherein generating at least one spatiotemporal pattern comprises generating the at least one spatiotemporal pattern by executing scene-cut through at least one of color histogram analysis and color correlation analysis of the plurality of frames; and
generating the at least one spatiotemporal pattern by executing scene-cut based on continuity of the at least one spatiotemporal pattern.

14. The video analysis method of claim 11, wherein the extracting generating a segmentation map comprises:
generating a plurality of partial spatiotemporal patterns by segmenting each of the at least one spatiotemporal pattern based on a first time length; and
generating the segmentation map by a region segmentation from a first partial spatiotemporal pattern among the plurality of partial spatiotemporal patterns.

15. The video analysis method of claim 11, wherein the extracting of the region of interest comprises:
extracting a plurality of bounding boxes including each of boundaries of the segmentation map; and
selecting at least one bounding box satisfying a predetermined condition as the at least one region of interest.

16. The video analysis method of claim 11, wherein the performing a frequency analysis comprises:
transforming the at least one region of interest into a one-dimensional signal to generate a first signal;
transforming the first signal to a frequency domain to generate a second signal; and
determining whether the input video includes the predetermined type of content by analyzing a frequency distribution of the second signal.

17. A non-transitory computer-readable medium comprising a program for instructing a computer to perform a video analysis method, the video analysis method comprising:
generating at least one spatiotemporal pattern by performing pixel sampling on a plurality of frames in an input video;
generating a segmentation map using a first partial spatiotemporal pattern of the at least one spatiotemporal pattern;
extracting at least one region of interest having a sinusoidal pattern from the segmentation map; and
performing a frequency analysis of the at least one region of interest to determine whether the input video includes a predetermined type of content.

* * * * *